US011898563B2

(12) United States Patent
Inouchi et al.

(10) Patent No.: US 11,898,563 B2
(45) Date of Patent: *Feb. 13, 2024

(54) AXIAL FAN

(71) Applicant: Nidec Corporation, Kyoto (JP)

(72) Inventors: Kazuhiro Inouchi, Kyoto (JP); Yuta Yamasaki, Kyoto (JP); Hidefumi Kawakami, Kyoto (JP); Hidenobu Takeshita, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/072,762

(22) Filed: Dec. 1, 2022

(65) Prior Publication Data

US 2023/0085818 A1 Mar. 23, 2023

Related U.S. Application Data

(63) Continuation of application No. 17/388,102, filed on Jul. 29, 2021, now Pat. No. 11,536,275.

(30) Foreign Application Priority Data

Jul. 31, 2020 (JP) ................................ 2020-131227

(51) Int. Cl.
*F04D 13/12* (2006.01)
*F04D 3/00* (2006.01)
*F04D 19/00* (2006.01)

(52) U.S. Cl.
CPC ............... *F04D 13/12* (2013.01); *F04D 3/00* (2013.01); *F04D 19/007* (2013.01); *F05D 2260/36* (2013.01)

(58) Field of Classification Search
CPC . F04D 19/007; F04D 25/166; H05K 7/20172; F05D 2260/36
See application file for complete search history.

(56) References Cited

U.S. PATENT DOCUMENTS 8,123,461 B2 * 2/2012 Yoshida ................ F04D 19/007 415/214.1
8,133,006 B2 * 3/2012 Yoshida ............. F04D 25/0613 415/68

(Continued)

OTHER PUBLICATIONS

Inouchi et al., "Axial Fan", U.S. Appl. No. 17/388,102, filed Jul. 29, 2021.

*Primary Examiner* — Courtney D Heinle
*Assistant Examiner* — Ryan C Clark
(74) *Attorney, Agent, or Firm* — Keating & Bennett, LLP

(57) ABSTRACT

An axial fan includes a housing, an upper motor, and a lower motor. The housing includes an upper housing and a lower housing. A lower peripheral wall of the lower housing includes first engaging portions and lower protruding pieces. The lower protruding pieces oppose the first engaging portions in an axial direction and protrude axially upward from an axially upper surface. An upper peripheral wall of the upper housing includes upper engaging claws and upper notch grooves. The upper engaging claws extend axially downward from an axially lower surface, and include a second engaging portion that engages with the first engaging portion in a lower end portion. The upper notch grooves are notched axially upward from the axially lower surface radially inward of the upper engaging claw. At least a portion of the lower protruding pieces is located in the upper notch grooves.

6 Claims, 6 Drawing Sheets

(56) References Cited

U.S. PATENT DOCUMENTS

| | | | | |
|---|---|---|---|---|
| 8,475,126 | B2 * | 7/2013 | Yoshida | F04D 19/007 415/214.1 |
| 11,280,351 | B2 * | 3/2022 | Tokuno | F04D 29/646 |
| 2011/0070080 | A1 * | 3/2011 | Peng | F04D 29/668 361/679.48 |
| 2013/0343871 | A1 * | 12/2013 | Sun | F04D 19/007 415/68 |
| 2015/0226230 | A1 * | 8/2015 | Chang | F04D 19/007 415/200 |
| 2022/0034325 | A1 * | 2/2022 | Inouchi | F04D 19/007 |

* cited by examiner

AXIAL FAN

CROSS-REFERENCE TO RELATED APPLICATIONS

The present application claims priority under 35 U.S.C. § 119 to Japanese Patent Application No. 2020-131227, filed on Jul. 31, 2020, the entire contents of which are hereby incorporated herein by reference.

1. FIELD OF THE INVENTION

The present disclosure relates to an axial fan.

2. BACKGROUND

In a conventional axial fan, a housing surrounding a central axis is formed by connecting an upper housing and a lower housing. The upper housing accommodates an upper motor that rotates an upper impeller about the central axis. The lower housing accommodates a lower motor that rotates a lower impeller about the central axis.

The upper housing has a plurality of upper engaging claws extending axially downward, and the upper engaging claws engage with the lower housing.

However, there has been a problem in the conventional axial fan that when the rigidity of the housing is increased, the upper engaging claw becomes less flexible and assembling workability of the upper housing and the lower housing decreases.

SUMMARY

An example embodiment of an axial fan of the present disclosure includes a housing, an upper motor, and a lower motor. The housing surrounds a vertically extending central axis and is defined by an upper housing and a lower housing fixed to each other. The upper housing surrounds a vertically extending central axis and is in an axially upper portion. The lower housing is in an axially lower portion. The upper motor is accommodated in the upper housing and rotates an upper impeller about the central axis. The lower motor is accommodated in the lower housing and rotates a lower impeller about the central axis. The upper housing includes a cylindrical upper peripheral wall covering the upper impeller and the upper motor from a radially outer side. The lower housing includes a cylindrical lower peripheral wall covering the lower impeller and the lower motor from the radially outer side. The lower peripheral wall includes first engaging portions and lower protruding pieces. The first engaging portions are on a radially outer surface. The lower protruding pieces oppose the first engaging portions in the axial direction and protrude axially upward from an axially upper surface. The upper peripheral wall includes upper engaging claws and upper notch grooves. The upper engaging claws extend axially downward from an axially lower surface, and include a second engaging portion that engages with the first engaging portions in a lower end portion. The upper notch grooves are notched axially upward from the axially lower surface on a radially inward of the upper engaging claw. At least a portion of the lower protruding pieces is located in the upper notch grooves.

The above and other elements, features, steps, characteristics and advantages of the present disclosure will become more apparent from the following detailed description of the example embodiments with reference to the attached drawings.

DETAILED DESCRIPTION

Figure 3:
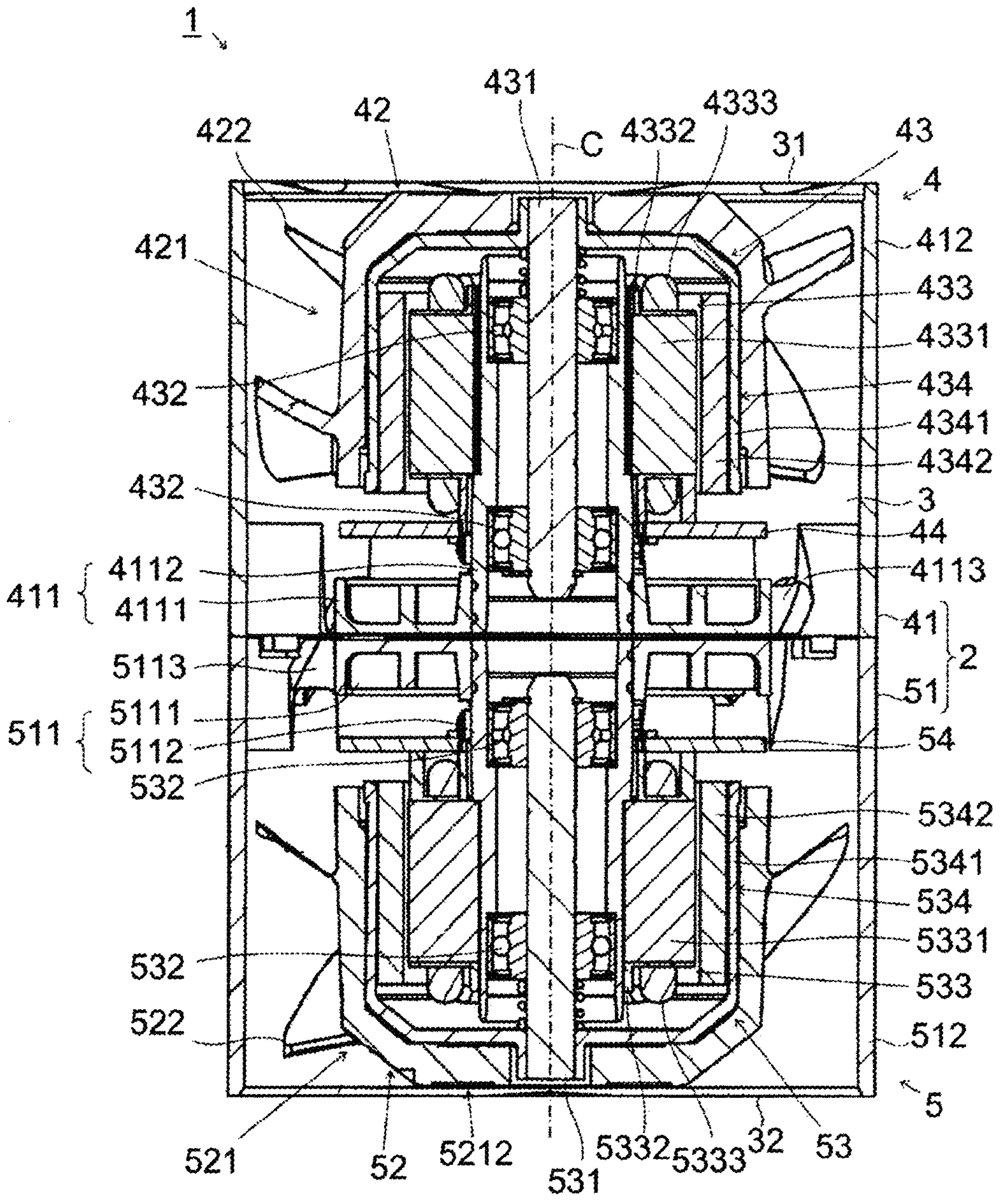
FIG. 3 is a longitudinal section of an axial fan of an example embodiment of the present disclosure.

Hereinafter, example embodiments of the present disclosure will be described in detail with reference to the accompanying drawings. In the specification, a direction in which a central axis of an axial fan extends is simply referred to as "axial direction", a direction perpendicular to the central axis of the axial fan as the center is simply referred to as "radial direction", and a direction extending along a circular arc centered on the central axis of the axial fan is simply referred to as "circumferential direction". Additionally, for the sake of convenience in description, in the specification, the axial direction is assumed to be the vertical direction, and the shape of parts and positional relationships among the parts are described on the assumption that the vertical direction in FIG. 3 is the vertical direction of the axial fan. The "upper side" of the axial fan is the "intake side" and the "lower side" of the axial fan is the "exhaust side". It should be noted, however, that the above definition of the vertical direction is not meant to restrict the orientation of, or positional relationships among parts of, the axial fan during use. Additionally, in the specification, a section parallel to the axial direction is referred to as a "longitudinal section". Additionally, the term "parallel" used in the specification does not mean parallel in a strict sense, but includes substantially parallel.

Figure 1:
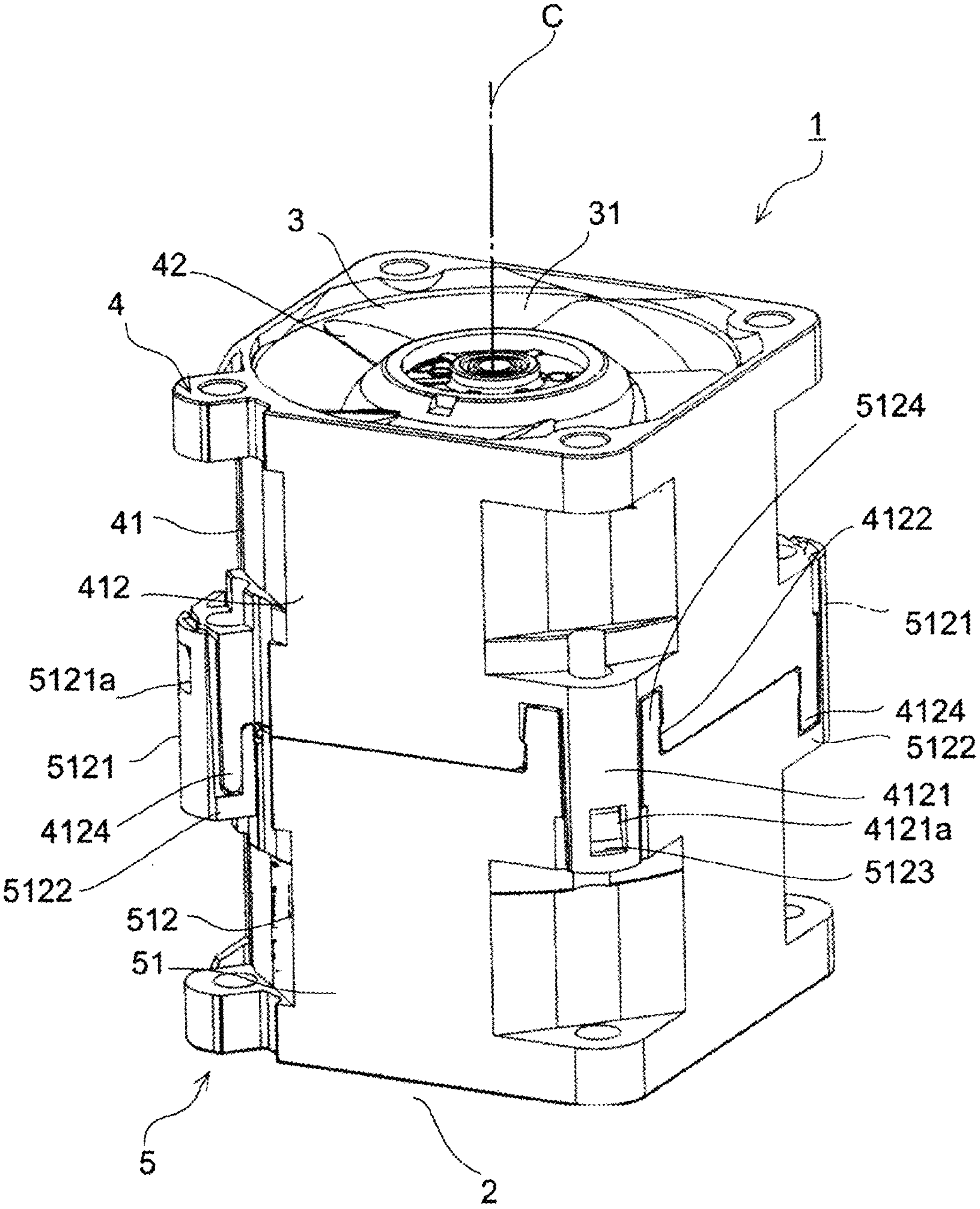
FIG. 1 is an overall perspective view of an axial fan of an example embodiment of the present disclosure.
Figure 2:
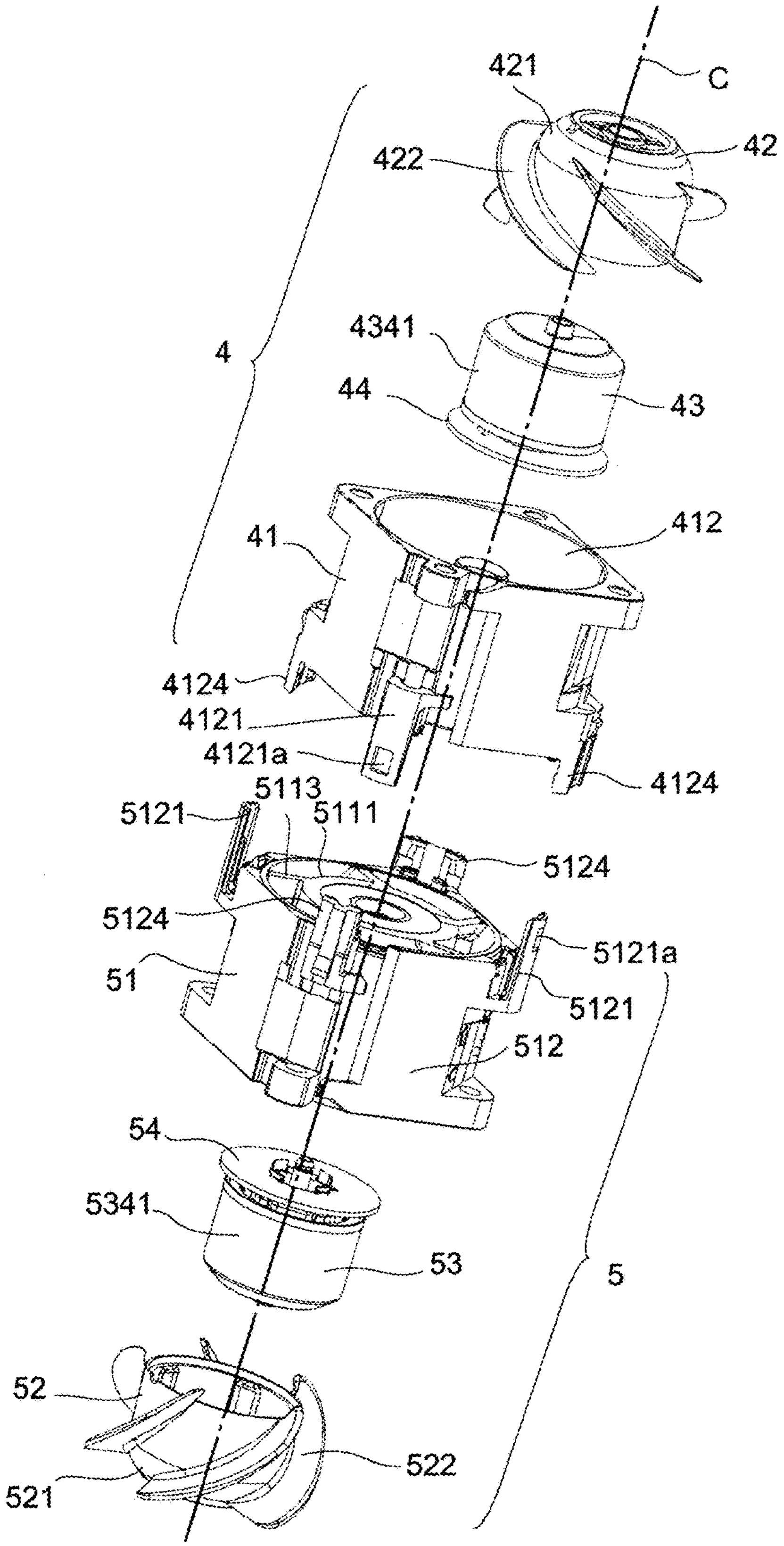
FIG. 2 is an exploded perspective view of an axial fan of an example embodiment of the present disclosure.

FIG. 1 is an overall perspective view of an example of an axial fan 1 according to an example embodiment of the present disclosure, and FIG. 2 is an exploded perspective view of the axial fan 1. FIG. 3 is a longitudinal section of the axial fan. The axial fan 1 is configured by connecting an upper fan 4 and a lower fan 5.

The upper fan 4 has an upper housing 41, an upper impeller 42, an upper motor 43, and an upper circuit board 44. The lower fan 5 has a lower housing 51, a lower impeller 52, a lower motor 53, and a lower circuit board 54.

The upper housing 41 and the lower housing 51 are connected in the axial direction to form a housing 2. The connection structure of the upper housing 41 and the lower housing 51 will be described in detail later. The housing 2 has an air flow passage 3 therein. The air flow passage 3 extends along a central axis C inside the housing 2. The air flow passage 3 has an air inlet 31 at its upper end and an air outlet 32 at its lower end.

The upper housing 41 is a resin-molded article, and accommodates the upper impeller 42, the upper motor 43, and the upper circuit board 44 therein. The upper housing 41 has an upper motor base portion 411 and an upper peripheral wall 412.

The upper motor base portion 411 has a base 4111, a bearing holder 4112, and an upper support portion 4113.

The base 4111 is disposed axially below the upper motor 43, and has a disk shape that spreads in the radial direction around the central axis C. The bearing holder 4112 protrudes axially upward from an upper surface of the base 4111 and has a cylindrical shape centered on the central axis C.

The upper support portion 4113 extends radially outward from a radially outer surface of the base 4111 to connect the base 4111 and the upper peripheral wall 412. A plurality of upper support portions 4113 are arranged in the circumferential direction. Air flowing through the air flow passage 3 passes between adjacent upper support portions 4113.

The upper peripheral wall 412 is disposed radially outward of the upper impeller 42. The upper peripheral wall 412 has a cylindrical shape extending to upper and lower sides in the axial direction. That is, the upper peripheral wall 412 covers the upper impeller 42 and the upper motor 43 from the radially outer side. The air flow passage 3 is disposed radially inward of the upper peripheral wall 412. The air inlet 31 is disposed at the axially upper end of the upper peripheral wall 412.

The upper impeller 42 is disposed radially inward of the upper housing 41, and axially above and radially outward of the upper motor 43. The upper impeller 42 is rotated about the central axis C by the upper motor 43. The upper impeller 42 has an upper impeller cup 421 and a plurality of upper blades 422.

The upper impeller cup 421 is fixed to the upper motor 43. The upper impeller cup 421 is a substantially cylindrical member having a lid on the upper side in the axial direction. The plurality of upper blades 422 are circumferentially arranged on an outer surface of the upper impeller cup 421.

The upper motor 43 is accommodated in the upper housing 41. The upper motor 43 is supported by the upper motor base portion 411. The upper motor 43 rotates the upper impeller 42 about the central axis C. The upper motor 43 has an upper shaft 431, upper bearings 432, an upper stator 433 and an upper rotor 434.

The upper shaft 431 extends along the central axis C. The upper shaft 431 is a columnar member which is made of metal such as stainless steel and extends to upper and lower sides in the axial direction. The upper shaft 431 is rotatably supported about the central axis C by the upper bearings 432.

The upper bearings 432 are arranged in at least an upper and lower pair in the axial direction. The upper bearings 432 are held inside the bearing holder 4112. The upper bearing 432 is configured of a ball bearing, or may be configured of a sleeve bearing, for example. The upper and lower pair of upper bearings 432 in the axial direction support the upper shaft 431, so that the upper shaft 431 is rotatable about the central axis C relative to the upper housing 41.

The upper stator 433 is fixed to an outer peripheral surface of the bearing holder 4112. The upper stator 433 has a stator core 4331, an insulator 4332, and a coil 4333.

The stator core 4331 is configured by laminating electromagnetic steel plates such as silicon steel plates on top of one another, for example. The insulator 4332 is made of an insulating resin. The insulator 4332 surrounds an outer surface of the stator core 4331. The coil 4333 is configured of a conducting wire wound around the stator core 4331 through the insulator 4332.

The upper rotor 434 is disposed axially above and radially outward of the upper stator 433. The upper rotor 434 rotates about the central axis C relative to the upper stator 433. The upper rotor 434 has a rotor yoke 4341 and a magnet 4342.

The rotor yoke 4341 is a substantially cylindrical member that is made of a magnetic material and has a lid on the upper side in the axial direction. The rotor yoke 4341 is fixed to the upper shaft 431. The magnet 4342 has a cylindrical shape, and is fixed to an inner peripheral surface of the rotor yoke 4341. The magnet 4342 is disposed radially outward of the upper stator 433.

The upper circuit board 44 is disposed axially below the upper impeller 42 and the upper motor 43 and axially above the base 4111 of the upper motor base portion 411. The upper circuit board 44 has a disk shape that spreads in the radial direction around the central axis C, for example. A lead of the coil 4333 is electrically connected to the upper circuit board 44. An electric circuit for supplying a drive current to the coil 4333 is mounted on the upper circuit board 44.

In the upper fan 4 configured as described above, when a drive current is supplied to the coil 4333 of the upper motor 43 through the upper circuit board 44, a radial magnetic flux is generated in the stator core 4331. A magnetic field generated by the magnetic flux of the stator core 4331 and a magnetic field generated by the magnet 4342 act to generate torque in the circumferential direction of the upper rotor 434. The torque causes the upper rotor 434 and the upper impeller 42 to rotate about the central axis C. As the upper impeller 42 rotates, the plurality of upper blades 422 generate an air flow. That is, in the upper fan 4, air can be blown by generating an air flow where the upper side is the intake side and the lower side is the exhaust side.

The lower housing 51 is a resin-molded article, and accommodates the lower impeller 52, the lower motor 53, and the lower circuit board 54 therein. The lower housing 51 has a lower motor base portion 511 and a lower peripheral wall 512.

The lower motor base portion 511 has a base 5111, a bearing holder 5112, and a lower support portion 5113.

The base 5111 is disposed axially above the lower motor 53, and has a disk shape that spreads in the radial direction around the central axis C. The bearing holder 5112 protrudes axially downward from a lower surface of the base 5111 and has a cylindrical shape centered on the central axis C.

The lower support portion 5113 extends radially outward from a radially outer surface of the base 5111 to connect the base 5111 and the lower peripheral wall 512. A plurality of lower support portions 5113 are arranged in the circumferential direction. Air flowing through the air flow passage 3 passes between the adjacent lower support portions 5113.

The lower peripheral wall 512 is disposed radially outward of the lower impeller 52. The lower peripheral wall 512 has a cylindrical shape extending to upper and lower sides in the axial direction. That is, the lower peripheral wall 512 covers the lower impeller 52 and the lower motor 53 from the radially outer side. The air flow passage 3 is disposed radially inward of the lower peripheral wall 512. The air outlet 32 is disposed at the axially lower end of the lower peripheral wall 512.

The lower impeller 52 is disposed radially inward of the lower housing 51 and axially below and radially outward of the lower motor 53. The lower impeller 52 is rotated about the central axis C by the lower motor 53. The lower impeller 52 has a lower impeller cup 521 and a plurality of lower blades 522.

The lower impeller cup 521 is fixed to the lower motor 53. The lower impeller cup 521 is a substantially cylindrical member having a lid on the lower side in the axial direction. The plurality of lower blades 522 are circumferentially arranged on an outer surface of the lower impeller cup 521.

The lower motor 53 is accommodated in the lower housing 51. The lower motor 53 is supported by the lower motor base portion 511. The lower motor 53 rotates the lower impeller 52 about the central axis C. The lower motor 53 has a lower shaft 531, lower bearings 532, a lower stator 533, and a lower rotor 534.

The lower shaft 531 extends along the central axis C. The lower shaft 531 is a columnar member which is made of metal such as stainless steel and extends to upper and lower sides in the axial direction. The lower shaft 531 is rotatably supported about the central axis C by the lower bearings 532.

The lower bearings 532 are arranged in at least an upper and lower pair in the axial direction. The lower bearings 532 are held inside the bearing holder 5112. The lower bearing 532 is configured of a ball bearing, or may be configured of a sleeve bearing, for example. The upper and lower pair of lower bearings 532 in the axial direction support the lower shaft 531, so that the lower shaft 531 is rotatable about the central axis C relative to the lower housing 51.

The lower stator 533 is fixed to an outer peripheral surface of the bearing holder 5112. The lower stator 533 includes a stator core 5331, an insulator 5332, and a coil 5333.

The stator core 5331 is configured by laminating electromagnetic steel plates such as silicon steel plates on top of one another, for example. The insulator 5332 is made of an insulating resin. The insulator 5332 surrounds an outer surface of the stator core 5331. The coil 5333 is configured of a conducting wire wound around the stator core 5331 through the insulator 5332.

The lower rotor 534 is disposed axially below and radially outward of the lower stator 533. The lower rotor 534 rotates about the central axis C relative to the lower stator 533. The lower rotor 534 has a rotor yoke 5341 and a magnet 5342.

The rotor yoke 5341 is a substantially cylindrical member that is made of a magnetic material and has a lid on the lower side in the axial direction. The rotor yoke 5341 is fixed to the lower shaft 531. The magnet 5342 has a cylindrical shape, and is fixed to an inner peripheral surface of the rotor yoke 5341. The magnet 5342 is disposed radially outward of the lower stator 533.

The lower circuit board 54 is disposed axially above the lower impeller 52 and the lower motor 53 and axially below the base 5111 of the lower motor base portion 511. The lower circuit board 54 has a disk shape that spreads in the radial direction around the central axis C, for example. A lead of the coil 5333 is electrically connected to the lower circuit board 54. An electric circuit for supplying a drive current to the coil 5333 is mounted on the lower circuit board 54.

In the lower fan 5 configured as described above, when a drive current is supplied to the coil 5333 of the lower motor 53 through the lower circuit board 54, a radial magnetic flux is generated in the stator core 5331. A magnetic field generated by the magnetic flux of the stator core 5331 and a magnetic field generated by the magnet 5342 act to generate torque in the circumferential direction of the lower rotor 534. The torque causes the lower rotor 534 and the lower impeller 52 to rotate about the central axis C. As the lower impeller 52 rotates, the plurality of lower blades 522 generate an air flow. That is, in the lower fan 5, air can be blown by generating an air flow where the upper side is the intake side and the lower side is the exhaust side.

Figure 4:
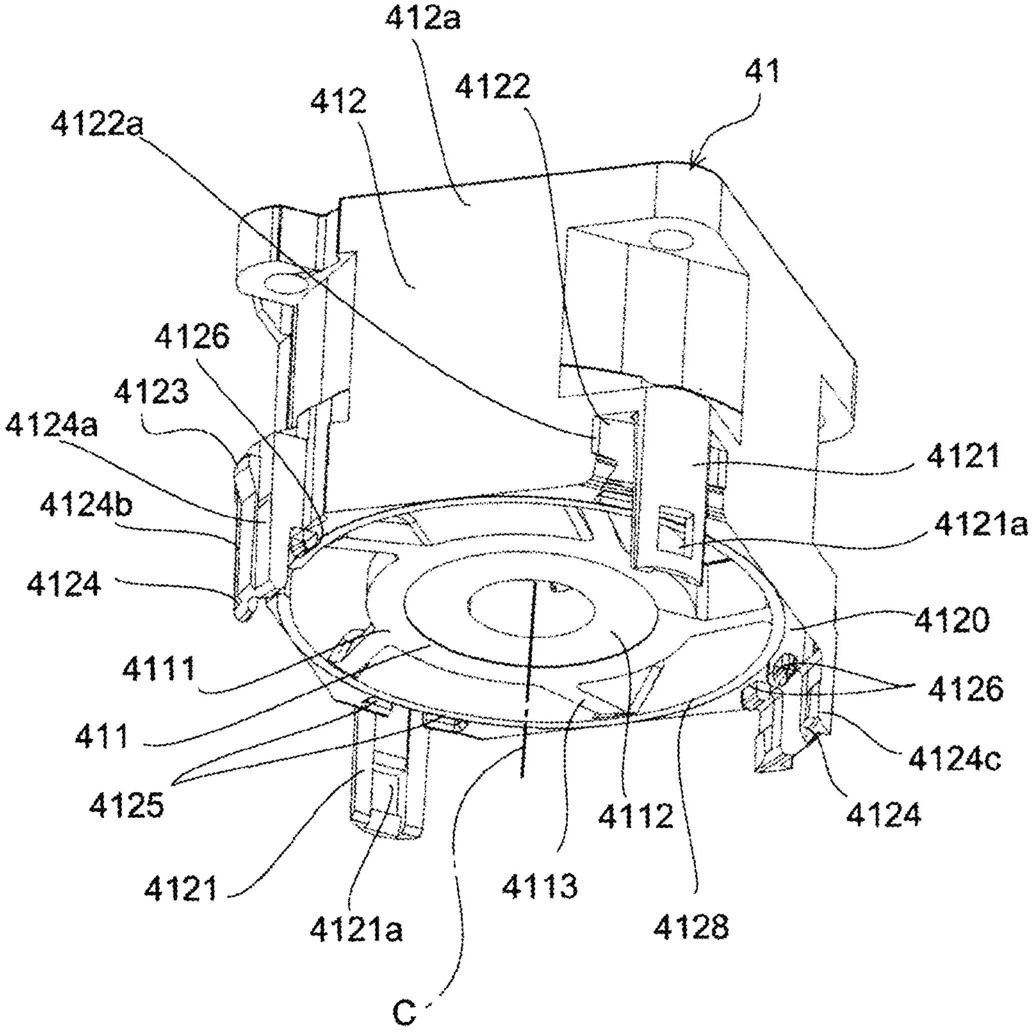
FIG. 4 is a perspective view of an upper housing of an axial fan of an example embodiment of the present disclosure.

FIG. 4 is a perspective view of the upper housing 41, illustrating a state in which the upper housing 41 is viewed from the axially lower side. The upper peripheral wall 412 of the upper housing 41 has a pair each of upper engaging claws 4121, upper notch grooves 4122, upper engaging male portions (third engaging portions) 4123, upper protruding pieces 4124, upper recesses 4125, and upper protrusions 4126. Additionally, the upper peripheral wall 412 has an upper annular rib 4128.

The upper engaging claw 4121 extends axially downward from an axially lower surface 4120 of the upper peripheral wall 412, and has an upper engaging female portion (second engaging portion) 4121*a* in a lower end portion thereof. In the present example embodiment, the upper engaging female portion 4121*a* includes a through hole penetrating the upper engaging claw 4121 in the radial direction. Note that the upper engaging female portion 4121*a* is not limited to the through hole, and may be configured by forming a recess on a radially inner surface of the upper engaging claw 4121. The circumferential width of the upper engaging claw 4121 narrows toward the axially lower side.

The upper notch groove 4122 is formed by being notched axially upward from the axially lower surface 4120 on the radially inward of the upper engaging claw 4121. In other words, the upper notch groove 4122 has a recessed shape recessed in the axial direction. Both circumferential ends of the upper notch groove 4122 are open. By forming the upper notch groove 4122, the upper engaging claw 4121 becomes radially flexible. Additionally, the upper notch groove 4122 has an upper notch groove recess 4122*a* recessed radially inward from an upper end portion thereof (see FIG. 6).

Figure 6:
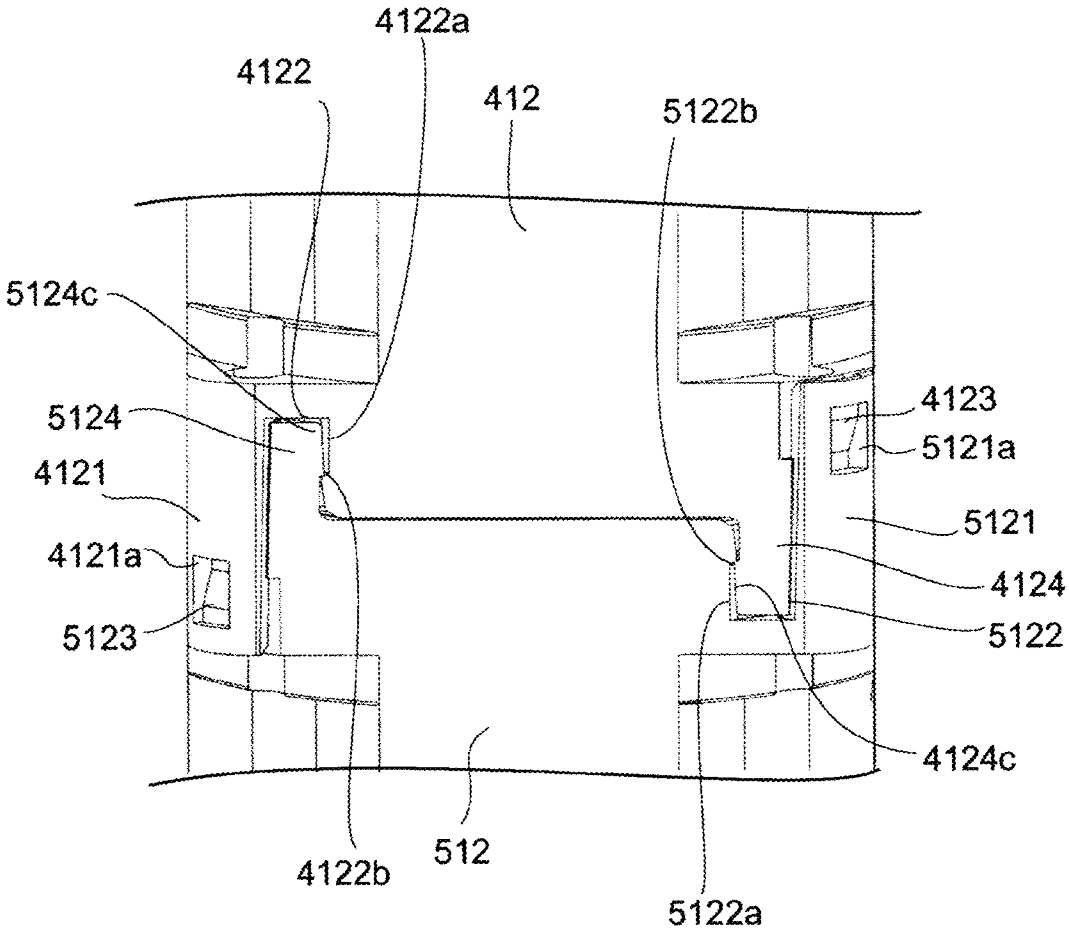
FIG. 6 is a perspective view illustrating a portion of a housing of an axial fan of an example embodiment of the present disclosure in an enlarged state.

The upper notch groove recess 4122*a* has an upper tapered portion 4122*b* inclined axially upward toward the radially inward on an inner surface of an axially lower portion of the upper notch groove recess 4122*a* (see FIG. 6).

The upper recess 4125 is recessed axially upward from the axially lower surface 4120 on the radially inward of the upper notch groove 4122. Two upper recesses 4125 are arranged side by side in the circumferential direction so as to face the upper notch groove 4122 in the radial direction.

The pair of upper engaging claws 4121, upper notch grooves 4122, and upper recesses 4125 are disposed so as to face each other in the radial direction with the central axis C interposed therebetween.

The upper engaging male portion 4123 protrudes radially outward from a radially outer surface 412*a* of the upper peripheral wall 412.

The upper protruding piece 4124 faces the upper engaging male portion 4123 in the axial direction and protrudes axially downward from the axially lower surface 4120. The upper protruding piece 4124 has an upper guide recess 4124*b* and an upper protruding piece protrusion 4124*c*. The upper guide recess 4124*b* is recessed radially inward from a radially outer surface 4124*a*, extends in the axial direction, and has an open lower end. Additionally, the upper guide recess 4124*b* faces the upper engaging male portion 4123 in the axial direction. The upper protruding piece protrusion 4124*c* protrudes radially inward from a lower end portion of the upper protruding piece 4124 (see FIG. 6).

The upper protrusion 4126 protrudes axially downward from the axially lower surface 4120 on the radially inward of the upper protruding piece 4124. Two upper protrusions 4126 are arranged side by side in the circumferential direction so as to face one upper protruding piece 4124 in the radial direction.

The pair of upper engaging male portions 4123, upper protruding pieces 4124, and upper protrusions 4126 are disposed so as to face each other in the radial direction with the central axis C interposed therebetween.

The upper engaging claws 4121 and the upper engaging male portions 4123 are alternately arranged at equal intervals in the circumferential direction. That is, a plurality of pairs of the upper engaging claw 4121 and upper notch groove 4122 facing each other in the radial direction are arranged at equal intervals in the circumferential direction. Additionally, a plurality of pairs of the upper engaging male portion 4123 and upper protruding piece 4124 facing each other in the axial direction are arranged at equal intervals in the circumferential direction.

The upper annular rib 4128 is formed in an annular shape, protrudes axially downward from the axially lower surface 4120 on the radially inward of the upper recess 4125, and surrounds the central axis C.

Figure 5:
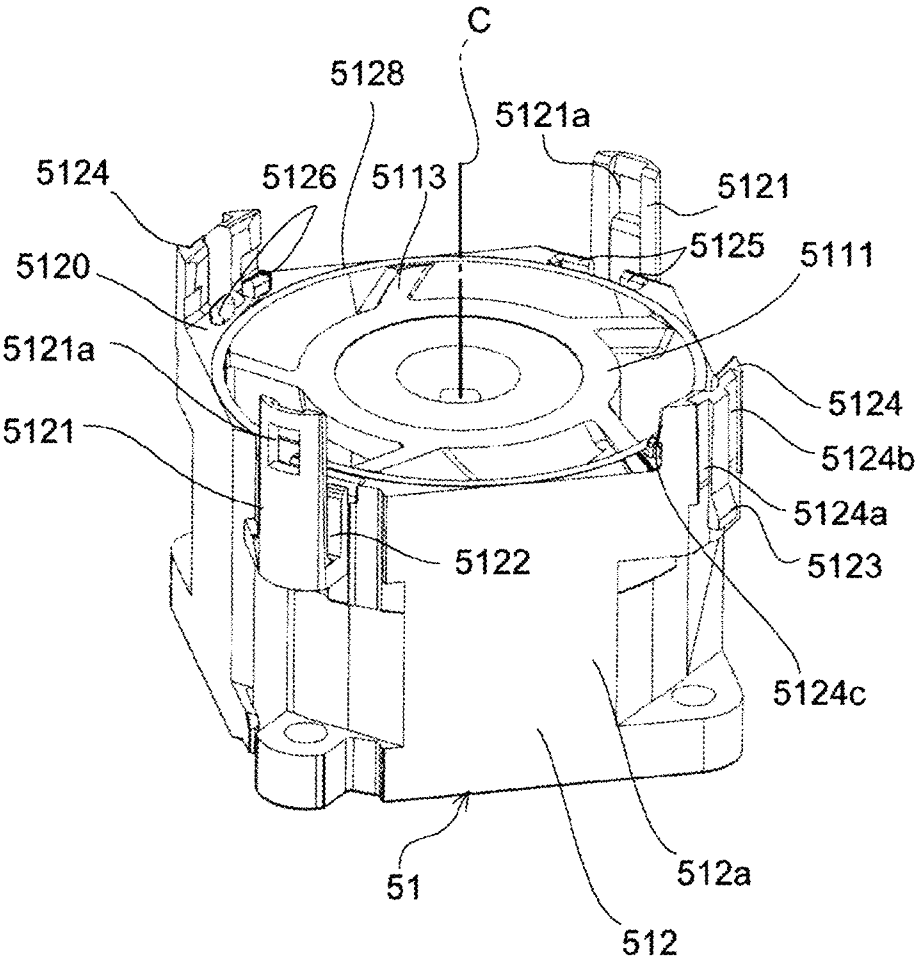
FIG. 5 is a perspective view of a lower housing of an axial fan of an example embodiment of the present disclosure.

FIG. 5 is a perspective view of the lower housing 51, illustrating a state in which the lower housing 51 is viewed from the axially upward. The lower peripheral wall 512 of the lower housing 51 has a pair each of lower engaging claws 5121, lower notch grooves 5122, lower engaging male portions (first engaging portions) 5123, lower protruding pieces 5124, lower recesses 5125, and lower protrusions 5126. Additionally, the lower peripheral wall 512 has a lower annular rib 5128.

The lower engaging claw 5121 extends axially upward from an axially upper surface 5120 of the lower peripheral wall 512, and has a lower engaging female portion (fourth engaging portion) 5121*a* in an upper end portion thereof. In the present example embodiment, the lower engaging female portion 5121*a* includes a through hole penetrating the lower engaging claw 5121 in the radial direction. Note that the lower engaging female portion 5121*a* is not limited to the through hole, and may be configured by forming a recess on a radially inner surface of the lower engaging claw 5121. The circumferential width of the lower engaging claw 5121 narrows toward the axially upper side.

The lower notch groove 5122 is formed by being notched axially downward from the axially upper surface 5120 on the radially inward of the lower engaging claw 5121. In other words, the lower notch groove 5122 has a recessed shape recessed in the axial direction. Both circumferential ends of the lower notch groove 5122 are open. By forming the lower notch groove 5122, the lower engaging claw 5121 becomes radially flexible. Additionally, the lower notch groove 5122 has a lower notch groove recess 5122*a* recessed radially inward from a lower end portion thereof (see FIG. 6).

The lower notch groove recess 5122*a* has a lower tapered portion 5122*b* inclined axially downward toward the radially inward on an inner surface of an axially upper portion of the lower notch groove recess 5122*a* (see FIG. 6).

The lower recess 5125 is recessed axially downward from the axially upper surface 5120 on the radially inward of the lower notch groove 5122. Two lower recesses 5125 are arranged side by side in the circumferential direction so as to face one lower notch groove 5122 in the radial direction.

The pair of lower engaging claws 5121, lower notch grooves 5122, and lower recesses 5125 are disposed so as to face each other in the radial direction with the central axis C interposed therebetween.

The lower engaging male portion 5123 protrudes radially outward from a radially outer surface 512*a* of the lower peripheral wall 512.

The lower protruding piece 5124 faces the lower engaging male portion 5123 in the axial direction and protrudes axially upward from the axially upper surface 5120. The lower protruding piece 5124 has a lower guide recess 5124*b* and a lower protruding piece protrusion 5124*c*. The lower guide recess 5124*b* is recessed radially inward from a radially outer surface 5124*a*, extends in the axial direction, and has an open upper end. Additionally, the lower guide recess 5124*b* faces the lower engaging male portion 5123 in the axial direction. The lower protruding piece protrusion 5124*c* protrudes radially inward from an upper end portion of the lower protruding piece 5124 (see FIG. 6).

The lower protrusion 5126 protrudes axially upward from the axially upper surface 5120 on the radially inward of the lower protruding piece 5124. Two lower protrusions 5126 are arranged side by side in the circumferential direction so as to face the lower protruding piece 5124 in the radial direction.

The pair of lower engaging male portions 5123, lower protruding pieces 5124, and lower protrusions 5126 are disposed to face each other in the radial direction with the central axis C interposed therebetween.

The lower engaging claws 5121 and the lower engaging male portions 5123 are alternately arranged at equal intervals in the circumferential direction. That is, a plurality of pairs of the lower engaging claw 5121 and lower notch groove 5122 facing each other in the radial direction are arranged at equal intervals in the circumferential direction. Additionally, a plurality of pairs of the lower engaging male portion 5123 and lower protruding piece 5124 facing each other in the axial direction are arranged at equal intervals in the circumferential direction.

The lower annular rib 5128 is formed in an annular shape, protrudes axially downward from the axially upper surface 5120 on the radially inward of the lower recess 5125, and surrounds the central axis C.

FIG. 6 is a perspective view illustrating a part of the housing 2 in an enlarged state. When the upper housing 41 and the lower housing 51 are connected, the lower end portion of the upper engaging claw 4121 is inserted into an upper end portion of the lower guide recess 5124*b*, and the upper end portion of the lower engaging claw 5121 is inserted into a lower end portion of the upper guide recess 4124*b*. At this time, the circumferential widths of the upper engaging claw 4121 and the lower engaging claw 5121 narrow toward the tip end side. As a result, the upper engaging claw 4121 and the lower engaging claw 5121 are easily inserted into the upper end portion of the lower guide recess 5124*b* and the lower end portion of the upper guide recess 4124*b*, respectively. Accordingly, workability is improved when assembling the housing 2.

Next, the upper housing 41 and the lower housing 51 are further brought even closer. At this time, the upper guide recess 4124*b* and the lower guide recess 5124*b* guide the upper engaging claw 4121 and the lower engaging claw 5121 to the lower engaging female portion 5121*a* and the upper engaging female portion 4121*a*, respectively. By providing the upper guide recess 4124*b* and the lower guide recess 5124*b*, workability is improved when assembling the housing 2.

Thereafter, the upper engaging male portion 4123 is inserted into and engaged with the lower engaging female portion 5121*a*. Additionally, the lower engaging male portion 5123 is inserted into and engaged with the upper engaging female portion 4121*a*. As a result, the upper housing 41 and the lower housing 51 are fixed in the axial direction (see FIG. 1).

At this time, the upper engaging claw 4121 and the lower engaging claw 5121 become radially flexible by forming the upper notch groove 4122 and the lower notch groove 5122. As a result, the upper engaging claw 4121 and the lower engaging claw 5121 can be easily moved along the upper guide recess 4124*b* and the lower guide recess 5124*b*. Accordingly, while improving rigidity of the upper housing 41 and the lower housing 51, workability can be improved when assembling the housing 2. Additionally, the upper engaging claw 4121 and the lower engaging claw 5121 can be energized radially inward to engage the upper engaging male portion 4123 and the lower engaging female portion 5121*a* more firmly. Additionally, the lower engaging male portion 5123 and the upper engaging female portion 4121*a* can be more firmly engaged. Additionally, the upper engaging claw 4121 and the lower engaging claw 5121 become flexible in the radial direction by forming the upper notch groove 4122 and the lower notch groove 5122, and stress concentrated on the upper engaging claw 4121 and the lower engaging claw 5121 can be reduced.

Additionally, at least a part of the lower protruding piece 5124 is located in the upper notch groove 4122. Additionally, at least a part of the upper protruding piece 4124 is located in the lower notch groove 5122. In the present example embodiment, the lower protruding piece 5124 is fitted into the upper notch groove 4122, and the upper protruding piece 4124 is fitted into the lower notch groove 5122. As a result, the upper housing 41 and the lower housing 51 can be firmly fixed in the circumferential direction (see FIG. 1).

At this time, the lower protruding piece protrusion 5124*c* comes into contact with the upper tapered portion 4122*b*. Additionally, the upper protruding piece protrusion 4124*c* comes into contact with the lower tapered portion 5122*b*. As a result, the contact area between the lower protruding piece protrusion 5124*c* and the upper tapered portion 4122*b* can be reduced, and the contact area between the upper protruding piece protrusion 4124*c* and the lower tapered portion 5122*b* can be reduced. Accordingly, rattling on the contact surface can be reduced.

Additionally, the upper protrusion 4126 is inserted into the lower recess 5125, and at least a part of the upper protrusion 4126 is located in the lower recess 5125. The lower protrusion 5126 is inserted into the upper recess 4125, and at least a part of the lower protrusion 5126 is located in the upper recess 4125. As a result, the upper housing 41 and the lower housing 51 can be easily positioned in the circumferential direction, and workability is improved when assembling the housing 2.

Additionally, the lower annular rib 5128 and the upper annular rib 4128 come into contact with each other to connect the upper housing 41 and the lower housing 51. As a result, the contact area between the upper housing 41 and the lower housing 51 can be reduced, and the accuracy of the flatness of the contact surface can be improved. Accordingly, rattling on the contact surface can be reduced.

Additionally, a plurality of pairs of the upper engaging male portion 4123 and upper protruding piece 4124 facing each other in the axial direction, a plurality of pairs of the lower engaging claw 5121 and lower notch groove 5122 facing each other in the radial direction, a plurality of pairs of the lower engaging male portion 5123 and lower protruding piece 5124 facing each other in the axial direction, and a plurality of pairs of the upper engaging claw 4121 and upper notch groove 4122 facing each other in the radial direction are arranged at equal intervals in the circumferential direction, so that the upper housing 41 and the lower housing 51 are stably fixed in the circumferential and axial directions.

While example embodiments of the present disclosure have been described above, it will be understood that the scope of the present disclosure is not limited to the above-described example embodiments, and that various modifications may be made to the above-described example embodiments without departing from the gist of the present disclosure. In addition, features of the above-described example embodiments and the modifications thereof may be combined appropriately as desired.

In the present example embodiment, the air inlet 31 is provided at the upper end of the air flow passage 3 and the air outlet 32 is provided at the lower end thereof. However, the air inlet 31 may be provided at the lower end of the air flow passage 3 and the air outlet 32 may be provided at the upper end thereof.

Additionally, in the present example embodiment, the lower engaging male portion (first engaging portion) 5123 may be formed into a female shape, and the upper engaging female portion (second engaging portion) 4121*a* may be formed into a male shape to be engaged with each other. Additionally, the upper engaging male portion (third engaging portion) 4123 may be formed into a female shape, and the lower engaging female portion (fourth engaging portion) 5121*a* may be formed into a male shape to be engaged with each other.

Additionally, the upper housing 41 and the lower housing 51 may be connected by omitting the upper engaging male portion 4123 and upper protruding piece 4124 while providing a plurality of the upper engaging claws 4121 and upper notch grooves 4122 in the upper housing 41, and omitting the lower engaging claw 5121 and lower notch groove 5122 while providing a plurality of the lower engaging male portions 5123 and lower protruding pieces 5124 in the lower housing 51.

Similarly, the upper housing 41 and the lower housing 51 may be connected by omitting the upper engaging claw 4121 and upper notch groove 4122 while providing a plurality of the upper engaging male portions 4123 and upper protruding pieces 4124 in the upper housing 41, and omitting the lower engaging male portion 5123 and lower protruding piece 5124 while providing a plurality of the lower engaging claws 5121 and lower notch grooves 5122 in the lower housing 51.

The present disclosure is applicable to an axial fan, for example.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. An axial fan comprising:

a housing that surrounds a vertically extending central axis, and includes an upper housing in an axially upper portion and a lower housing in an axially lower portion;

an upper motor that is accommodated in the upper housing and rotates an upper impeller about the central axis; and a lower motor that is accommodated in the lower housing and rotates a lower impeller about the central axis; wherein the upper housing includes a cylindrical upper peripheral wall covering the upper impeller and the upper motor from a radially outer side;

the lower housing includes a cylindrical lower peripheral wall covering the lower impeller and the lower motor from the radially outer side;

the lower housing includes lower protruding portions and lower protrusions including at least a portion located radially inward from the lower protruding portions, the lower protruding portions and the lower protrusions extending axially upwards from an axially upper surface of the lower housing; or the upper housing includes upper protruding portions and upper protrusions including at least a portion located radially inward from the upper protruding portions, the upper protruding portions and the upper protrusions extending axially downwards from an axially lower surface of the upper housing.

2. The axial fan according to claim 1, wherein the lower protruding portions extend further in an axial direction than the lower protrusions extend in the axial direction; or, the upper protruding portions extend further in an axial direction than the upper protrusions extend in the axial direction.

3. The axial fan according to claim 1, wherein the lower protruding portions and the lower protrusions are located at a same circumferential position on the lower housing; or, the upper protruding portions and the upper protrusions are located at a same circumferential position on the upper housing.

4. The axial fan according to claim 1, wherein the upper peripheral wall includes upper engaging portions on a radially outer surface, and lower protruding portions opposing the upper engaging portions in an axial direction;

the lower peripheral wall includes lower engaging claws each extending axially upward and including a lower engaging portion engaging with the upper engaging portion in an upper end portion, and lower notch grooves notched axially downward from an axially lower surface on the radially inward of the lower engaging claws; and at least a portion of the upper protruding piece is located in the lower notch groove.

5. An axial fan comprising:

a housing that surrounds a vertically extending central axis, and includes an upper housing in an axially upper portion and a lower housing in an axially lower portion;

an upper motor that is accommodated in the upper housing and rotates an upper impeller about the central axis; and a lower motor that is accommodated in the lower housing and rotates a lower impeller about the central axis; wherein the upper housing includes a cylindrical upper peripheral wall covering the upper impeller and the upper motor from a radially outer side;

the lower housing includes a cylindrical lower peripheral wall covering the lower impeller and the lower motor from the radially outer side;

the lower peripheral wall includes lower engaging portions defined at a curved portion of a radially outermost surface of the lower housing;

the upper peripheral wall includes upper engaging portions defined at a curved portion of a radially outermost surface of the upper housing;

at least one of the lower engaging portions extends in parallel with a curved portion of a radially outermost surface of the lower housing;

at least one of the upper engaging portions extends in parallel with a curved portion of a radially outermost surface of the upper housing; and at least one of the upper engaging portions engages with at least one of the lower engaging portions to affix the upper housing to the lower housing.

6. The axial fan according to claim 5, wherein the lower engaging portions and upper engaging portions oppose one another in an axial direction.

* * * * *